Patented June 20, 1939

2,163,099

UNITED STATES PATENT OFFICE 2,163,099

PROCESS OF PREPARING N-METHYL BETA HYDROXYETHYLAMINES

Robert William Maxwell, Wilmington, Del., assignor to E. I. du Pont de Nemours & Company, Wilmington, Del., a corporation of Delaware No Drawing. Application April 18, 1938, Serial No. 202,779

17 Claims. (Cl. 260—584)

This invention relates to the preparation of mixed hydroxyalkylamines, more particularly to the preparation of amines having methyl and hydroxyalkyl groups on the amino nitrogen, and still more particularly to the replacement of the amino hydrogen of hydroxyalkylamines by methyl.

In general, the methylation of hydroxyalkylamines presents particular problems because of the complicating effect of the negative hydroxyl group, which may profoundly influence the particular preparative method chosen, e. g., by causing ether formation or by affecting the reactivity of the amino group. Possibly the best method heretofore known for making N-methyl-N-hydroxyethyl and related hydroxyalkylamines has been to react methylamines with compounds such as ethylene oxide and ethylene chlorohydrin. These reagents are, however, relatively costly and the reaction is complicated by the formation of large quantities of by-products with attendant decrease in the yields of the desired amines. For example, a considerable amount of the hydroxyalkylether of dimethylaminoethanol is formed when dimethylamine is treated with ethylene oxide. The methylation, with methyl halides, of hydroxyalkaylamines having amino hydrogen is not a satisfactory process because the formation of quaternary salts is even more excessive than is ordinarily true in the reaction of simple alkylamines with methyl halides.

This invention has as an object the provision of a new and improved process for replacing, by methyl, a hydrogen on the amino nitrogen of hydroxyalkylamines in which the amino group is primary or secondary. A further object is such a process using available and low priced raw materials. A still further object is a process not requiring the use of high pressures with attendant danger and expense.

These objects are accomplished by the following invention wherein an hydroxyalkylamine having at least one amino hydrogen atom and a chain of at least two carbon atoms between the amino nitrogen atom and the hydroxyl oxygen atom is reacted with formaldehyde and formic acid in substantially theoretical proportions and under other conditions more fully set forth below.

In carrying out the present process, it is usually desirable first to treat the hydroxyalkyl primary or secondary amine with formaldehyde, and then slowly add the formic acid. A reaction takes place quickly even at room temperature, carbon dioxide being evolved rapidly, and cooling often being necessary for proper control of the process. As the reaction proceeds, the temperature can be allowed to increase and the mixture is finally warmed and stirred gently at a temperature increasing from about 60° C. to about 100° C. until carbon dioxide is no longer evolved. A low boiling water immiscible solvent such as benzene is then added to the crude reaction product, the water and solvent distilled off as a binary at atmospheric pressure, and the desired product isolated by distillation in vacuo.

In addition to the methylated amines, there may also be produced to some extent formic acid esters of hydroxyl containing amines and formamide derivatives resulting from the reaction of incompletely methylated amines with formic acid. Where reaction conditions or starting materials are used which tend to give these compounds in amounts that interfere with the subsequent purification, these by-products can be destroyed by digestion with methyl alcohol containing hydrochloric acid. This removes excess formaldehyde in the form of methylal and the formic acid is taken out as methyl formate. The mixture can then be made alkaline and the product either extracted or distilled from the alkaline mixture. In some instances the formamide compound can be decomposed almost quantitatively by heating the mixture to about 225° C. whereupon the formamide derivative breaks down into carbon monoxide and amine. The product can then be distilled.

The more detailed practice of the invention is illustrated by the following examples, wherein parts given are by weight. There are of course many forms of the invention other than these specific embodiments.

EXAMPLE I

*β-Dimethylaminoethanol*

To 305 parts of β-hydroxyethylamine there was added in small portions with vigorous stirring 300 parts of paraformaldehyde. When the mixture had cooled somewhat, 550 parts of 85% aqueous formic acid was introduced at such a rate as to cause vigorous but not violent evolution of carbon dioxide. The mixture was then placed on a steam bath and warmed gently until gas evolution ceased. In order to compensate for the formaldehyde lost by volatilization with the carbon dioxide, an additional 75 parts was added in small amounts, addition being stopped when gas evolution ceased. This required about four hours. Finally 500 parts of benzene was mixed with the solution and the product dehydrated by distillation of the benzene-water binary, the water being separated and the benzene being returned to the still. The desired β-dimethylaminoethanol was then distilled from the reaction mixture at atmospheric pressure, the fraction boiling at 130–134° C. being collected. The yield was 360 parts, or 80% of the theoretical.

EXAMPLE II

*N-methyl-N-bis(β-hydroxyethyl)amine*

Four hundred twenty (420) parts of bis(β-hydroxyethyl)amine was mixed with 144 parts of paraformaldehyde and heated on a steam bath until the aldehyde had dissolved. Two hundred twenty (220) parts of 85% aqueous formic acid was then added slowly. Following incorporation of the formic acid, the mixture was heated on a steam bath for two hours, by which time foaming had ceased. The water was removed by adding benzene, distilling, separating benzene from water, and returning benzene to the reaction vessel. When the distillate became clear, the benzene was permanently distilled off at atmospheric pressure after which the desired N-methyl-N-bis(β-hydroxyethyl)amine was isolated by vacuum distillation, that fraction boiling 131–133° C./9 mm. being collected. The yield was 85%.

The preferred proportions of formaldehyde and formic acid are approximately one mol of formaldehyde and one mol of formic acid for each amino hydrogen which it is desired to replace by a methyl group. In some instances the quantity of formaldehyde can be increased with a corresponding decrease in the proportion of formic acid. Most satisfactory results are obtained when the formaldehyde is used in the form of paraformaldehyde, which reacts more rapidly and often gives somewhat higher yields. However, both aqueous formaldehyde and aqueous solutions of amines of various concentrations can be used if desired. The formic acid is normally added as an aqueous solution (the concentration of which need not necessarily be the 85% of the examples), but it may also be generated in situ (i. e., in the reaction mixture) by the addition of sodium formate and a mineral acid such as sulfuric.

The condensation of formaldehyde with amine normally takes place readily at room temperature, cooling often being necessary. In general, it is desirable to keep the reaction temperature low to minimize side reactions. Usually, if reaction at room temperature is incomplete, as shown by failure of the paraformaldehyde to dissolve, the reaction can be completed by warming to 50 to 80° C. Temperatures above 120° C. should be avoided. Pressures are preferably atmospheric, but may be above or below. If desired, additional water may be introduced as an inert diluent in order to moderate the reaction and reduce the viscosity of the mixture.

The process of the present invention is of generic applicability to hydroxyalkylamines having at least one amino hydrogen atom and having a chain of at least two carbon atoms between the amino nitrogen atom and the hydroxyl oxygen atom or atoms. Specific amines of this type which may be used include glucamine, N-methylglucamine, β-hydroxyethylamine, bis(β-hydroxyethyl)amine, γ-hydroxypropylamine, bis(γ-hydroxypropyl)amine, β-methyl-γ-hydroxypropylamine, N-methyl-N-(β-hydroxyethyl)amine, 2-hydroxycyclohexylamine, N - methyl - N - (4-hydroxycyclohexyl)amine, N - n - dodecyl-N-(4-hydroxycyclohexyl)amine, and N-n-butyl-N-(β-hydroxyethyl)amine.

It is to be noted that the term alkyl is used to include cycloalkyl.

The present process is particularly applicable to hydroxyethylamines, and their use constitutes a preferred embodiment of this invention. It is believed that the reaction takes a peculiar course in the case of the hydroxyethylamines, and that, with these amines, formaldehyde forms an oxazoline ring through splitting out of water between the formaldehyde oxygen and the amino hydrogen and hydrogen of the hydroxyl group, and that the particularly favorable results obtained with hydroxyethylamines may be due to such intermediates rather than methylol type compounds being involved.

The amino alcohols described herein, which are useful for a wide variety of synthetic and other purposes, heretofore have not been available except through rather expensive operations. Their esters are particularly interesting because they are basic and able to form water-soluble acid addition salts which have valuable properties as dyeing assistants and wetting out agents. Many of these amino alcohols are useful in the manufacture of pharmaceuticals. The solvent power of some of the lower members of the series is outstanding, and this method of preparation gives promise of furnishing amino alcohols at prices sufficiently low to make them available for this purpose. These amino alcohols are of use in the preparation of dialkylaminoethyl methacrylates which are important agents for modifying the dyeing characteristics of acetate rayon. These methacrylates are described in copending applications of Graves Ser. Nos. 21,807 and 42,054 and Harmon Ser. No. 21,810.

The outstanding advantage of the invention is that it permits the preparation of the N-methyl-N-hydroxyalkylamines using low cost reagents and apparatus readily available in most chemical establishments. The yields are good and by-product formation is not serious as in the case of the reaction of dimethylamine and other amines with ethylene oxide or ethylene chlorohydrin.

In the methylation of alkyl amines in the prior art using formaldehyde and formic acid, it has been customary or necessary to use large excesses (several hundred per cent) of formaldehyde and formic acid. It was therefore surprising that with the hydroxyalkylamines substantially theoretical proportions of these reagents are sufficient, i. e., one mol of formaldehyde and one mol of formic acid. It is further surprising that the reaction takes place at all since methylation of many amino acids cannot be effected by this method although amino acids are closely analogous substances

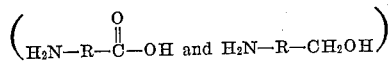

both having hydroxyl separated by at least two carbon atoms from the amino group.

The above description and examples are intended to be illustrative only. Any modification of or variation therefrom which conforms to the spirit of the invention is intended to be included within the scope of the claims.

I claim:

1. Process which comprises dissolving 144 parts of paraformaldehyde in 420 parts of bis(β-hydroxyethyl)amine at about 100° C., adding 220 parts of 85% aqueous formic acid and heating at about 100° C. until evolution of carbon dioxide ceases, and isolating the N-methyl-N,N-bis-(β-hydroxyethyl)amine by fractional distillation.

2. Process which comprises reacting one mol of bis(β-hydroxyethyl)amine with approximately one mol of paraformaldehyde and thereafter with approximately one mol of formic acid.

3. Process which comprises reacting one mol of β-hydroxyethylamine with approximately two mols of paraformaldehyde and thereafter with approximately two mols of formic acid.

4. Process which comprises reacting one mol of bis(β-hydroxyethyl)amine with approximately one mol of paraformaldehyde and approximately one mol of formic acid.

5. Process which comprises reacting one mol of β-hydroxyethylamine with approximately two mols of paraformaldehyde and approximately two mols of formic acid.

6. Process which comprises reacting a β-hydroxyethylamine having at least one amino hydrogen atom with about one mol each, per amino hydrogen atom, of formaldehyde and formic acid.

7. Process which comprises reacting a β-hydroxyethylamine having at least one amino hydrogen atom with formaldehyde and thereafter with formic acid.

8. Process which comprises reacting a β-hydroxyethylamine having at least one amino hydrogen atom with formaldehyde and formic acid.

9. Process which comprises reacting a β-hydroxyalkylamine having at least one amino hydrogen atom and a chain of at least two carbon atoms between the hydroxyl oxygen and the amino nitrogen, with formaldehyde and formic acid.

10. Process which comprises reacting at a temperature within the range from room temperature to 120° C. one mol of bis(β-hydroxyethyl)-amine with approximately one mol of paraformaldehyde and thereafter with approximately one mol of formic acid.

11. Process which comprises reacting at a temperature within the range from room temperature to 120° C. one mol of β-hydroxyethylamine with approximately two mols of paraformaldehyde and thereafter with approximately two mols of formic acid.

12. Process which comprises reacting at a temperature within the range from room temperature to 120° C. one mol of bis-(β-hydroxyethyl)-amine with approximately one mol of paraformaldehyde and approximately one mol of formic acid.

13. Process which comprises reacting at a temperature within the range from room temperature to 120° C. one mol of β-hydroxyethylamine with approximately two mols of paraformaldehyde and approximately two mols of formic acid.

14. Process which comprises reacting at a temperature within the range from room temperature to 120° C. a β-hydroxyethylamine having at least one amino hydrogen atom with about one mol each, per amino hydrogen atom, of formaldehyde and formic acid.

15. Process which comprises reacting at a temperature within the range from room temperature to 120° C. a β-hydroxyethylamine having at least one amino hydrogen atom with formaldehyde and thereafter with formic acid.

16. Process which comprises reacting at a temperature within the range from room temperature to 120° C. a β-hydroxyethylamine having at least one amino hydrogen atom with formaldehyde and formic acid.

17. Process which comprises reacting at a temperature within the range from room temperature to 120° C. a β-hydroxyalkylamine having at least one amino hydrogen atom and a chain of at least two carbon atoms between the hydroxyl oxygen and the amino nitrogen, with formaldehyde and formic acid.

ROBERT WILLIAM MAXWELL.